J. W. & H. R. BARCLAY.
GEARING.
APPLICATION FILED FEB. 14, 1911.
1,012,119.
Patented Dec. 19, 1911.
3 SHEETS—SHEET 2.
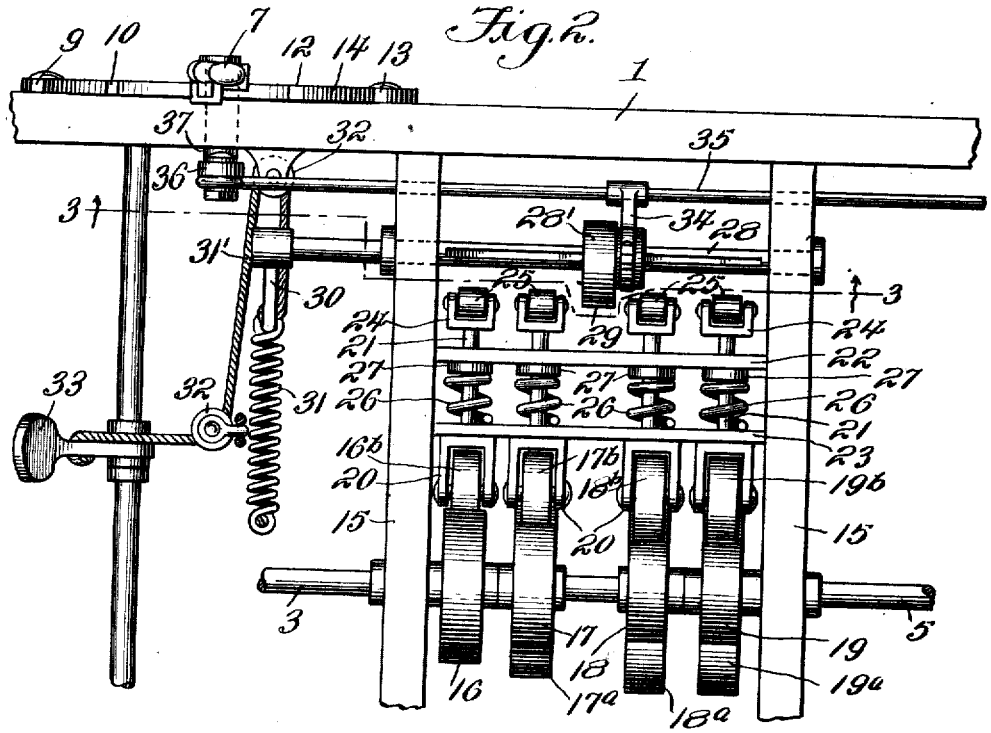
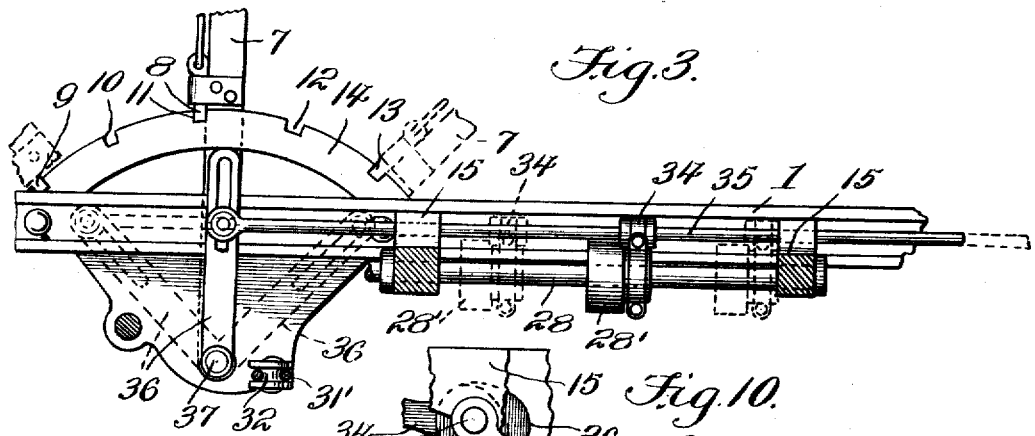

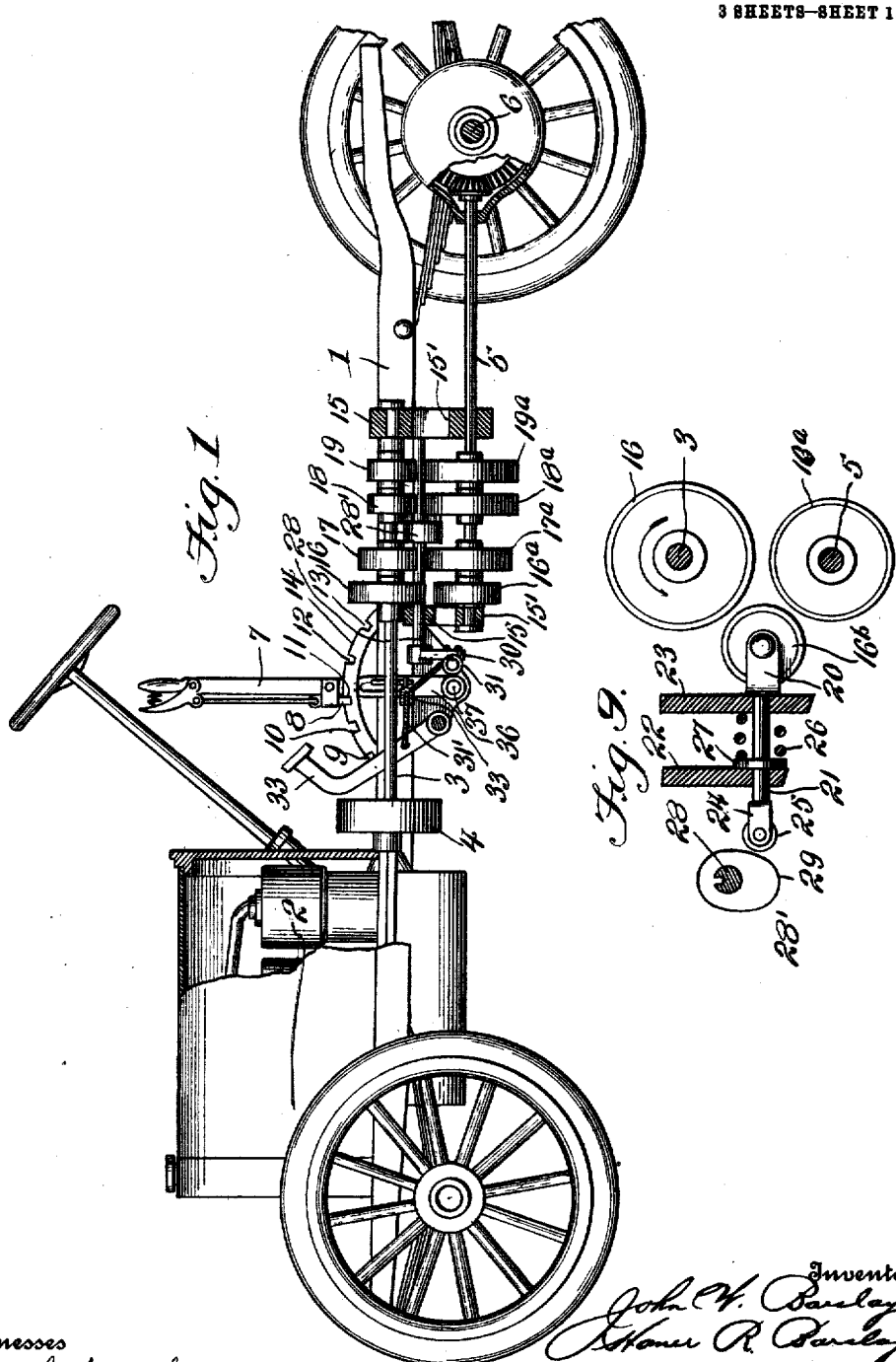

J. W. & H. R. BARCLAY.
GEARING.
APPLICATION FILED FEB. 14, 1911.
1,012,119.
Patented Dec. 19, 1911.
3 SHEETS—SHEET 3.
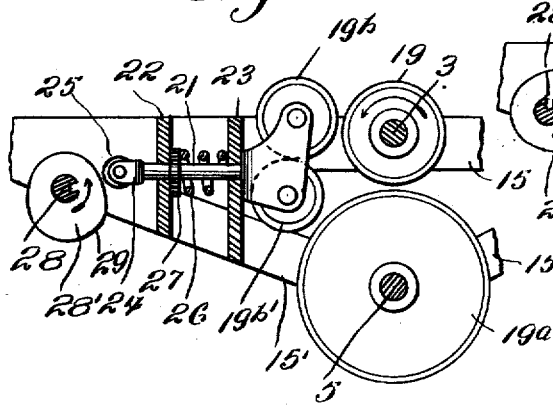
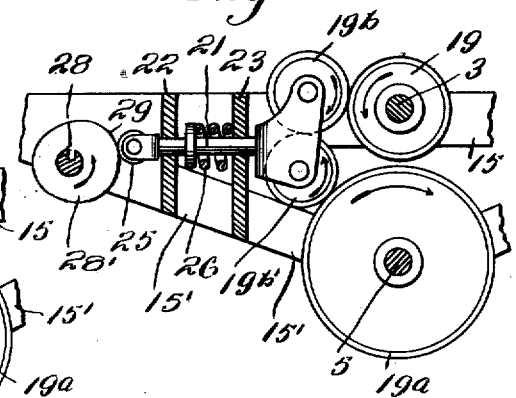
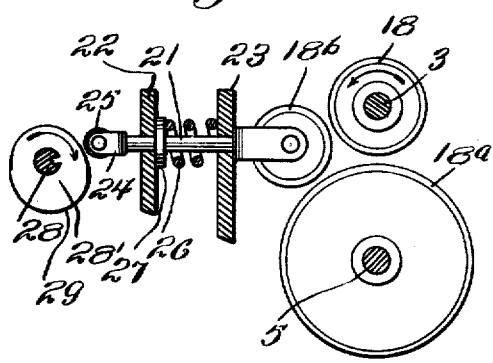
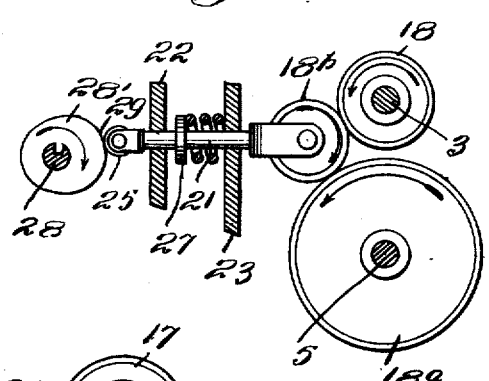
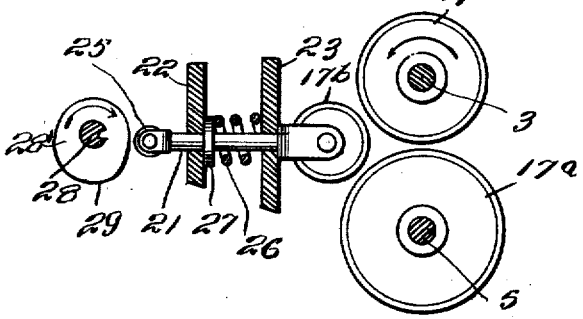
Witnesses:
J. T. L. Wright.
C. C. Hiner.
Inventors:
John W. Barclay
Henry R. Barclay
By their Attorney
COLUMBIA PLANOGRAPH CO., WASHINGTON, D. C.

UNITED STATES PATENT OFFICE.

JOHN W. BARCLAY AND HOMER R. BARCLAY, OF COVEL, ILLINOIS.

GEARING.

1,012,119.  Specification of Letters Patent.  Patented Dec. 19, 1911.

Application filed February 14, 1911  Serial No. 608,585.

*To all whom it may concern:*

Be it known that we, JOHN W. BARCLAY and HOMER R. BARCLAY, both citizens of the United States, residing at Covel, in the county of McLean and State of Illinois, have invented certain new and useful Improvements in Gearing, of which the following is a specification.

This invention relates to a variable speed and reverse gearing for automobiles and other power-driven vehicles, and particularly to transmission gearing of the friction type, the object of the invention being to provide a friction gearing of this character which reduces the amount of slippage and loss of energy common to all ordinary friction gearing when co-acting gear members are thrown into contact, and to provide controlling means whereby the various sets of gears may be easily, readily and positively thrown into and out of contact for the high, medium and low speed and reverse actions.

The invention consists of the features of construction, combination and arrangement of parts hereinafter described and claimed, reference being had to the accompanying drawings, in which:

Figure 1 is a view partly in side elevation and partly in vertical longitudinal section showing the application of the invention to an automobile chassis, the controlling lever being in neutral position. Fig. 2 is a top plan view on an enlarged scale showing the gearing and portion of the chassis on which it is mounted. Fig. 3 is an enlarged vertical transverse section on line 3—3 of Fig. 2, the different positions of the controlling lever being indicated in full and dotted lines. Figs. 4 and 5 are corresponding transverse sections showing the out and in position of the reverse gears. Figs. 6 and 7 are similar views of the low speed gears. Fig. 8 is a view similar to Figs. 4 and 6 of the medium speed gears, showing the same thrown out of engagement with each other. Fig. 9 is a similar view of the high speed gears. Fig. 10 is a detail front elevation of the rock shaft and associated parts for setting the actuating or adjusting cam.

In Figs. 4, 6, 8 and 9 the actuating or adjusting cam is shown in the relative position it assumes when the operating and controlling levers are in normal position.

Referring to the drawings, 1 designates the chassis or frame of an automobile; 2 the driving motor thereof; 3 the crank shaft of the motor, forming the "primary drive shaft" of the gearing; 4 the fly-wheel on said shaft; 5 a driven shaft, 6 the rear axle of the vehicle in gear with said driven shaft and receiving motion therefrom, and 7 a pivoted operating lever carrying a locking dog or pawl 8 to engage anyone of a series of notches 9, 10, 11, 12 and 13 in a rack 14 fixed to the frame for securing said lever in its different positions of adjustment.

The rear end of the drive shaft 3 is arranged to overlie the front end of the shaft 5, which ends of said shafts are respectively journaled upon one of a pair of cross bars 15 fixed to the frame and upon brackets 15' carried by said cross bars. Fixed to the shaft 3 are friction rollers or disks 16, 17, 18 and 19, and fixed to the shaft 5 are coöperating friction rollers or disks $16^a$, $17^a$, $18^a$ and $19^a$, the rollers or disks of one set being arranged opposite and spaced from the rollers or disks of the other set, as shown.

The co-acting pairs of rollers or disks 16 and $16^a$ 17 and $17^a$, 18 and $18^a$, respectively constitute high, medium and low speed couples, while the rollers or disks 19 and $19^a$ constitute a reversing couple, the rollers or disks of each couple being of proper relative diameter for the transmission of the desired rate of speed. Arranged for coöperation with the high, medium and low speed couples are transmission rollers or disks $16^b$, $17^b$ and $18^b$ and arranged for coöperation with the reversing couples in a pair of friction rollers or disks $19^b$ and $19^{b'}$, in contact for the transmission of motion from one to the other, as shown.

Mounted upon the bars 15 in parallel relation to the shafts 3 and 5 is a control shaft 28 journaled for a lateral rocking or oscillatory motion, and feathered to turn with and slide longitudinally along said shaft is an actuating or adjusting cam 28' preferably of oval or elliptical form, the point 29 of which cam is adapted to engage the antifriction roller 25 on any of the sliding rods 21 for selectively adjusting the transmission rollers into engagement with the co-acting couple. To the forward end of this shaft 28 is connected a crank arm 30 connected to the frame or chassis by a contractile spring 31 whereby the shaft is normally held to maintain the point of the cam swung inward or in projected position. Attached at one end to the arm 30 is a rope chain or cable 31' which passes over the guide pulleys 32 and is attached at its opposite end to a treadle or foot lever 33, by the depression of which the rope or cable will be drawn upon to pull the arm outwardly against the resistance of the spring, whereby the shaft 28 will be rocked to swing the point of the cam outwardly, so that said cam may be shifted on said shaft to engage the anti-friction roller 25 of any of the sliding supports 21 without interference from or contacting with any of the intervening rollers 25. The cam has an annularly grooved collar engaged by the forked end of a shipper arm 34 carried by a shipper rod 35 mounted on the bars 15 to slide parallel with the shaft 28. The forward end of this rod has a slip-joint connection with a crank arm 36 mounted on a rock shaft 37 to which is attached the operating lever 7, whereby the shipper rod may be moved in either direction to adjust or set the actuating cam.

In practice, the sliding supports are so arranged as to provide a space into which the point of the cam may project when the lever 7 is in neutral or "cut-out" position without interfering with any of said supports. In adjusting the cam from such position or any other position into engagement with a particular sliding support, the treadle is depressed to swing the cam outwardly, and the operating lever adjusted to the dedised position, whereby the cam will be shifted without interference from any of the rollers 25. When the lever and cam are set and the treadle released the spring will return shaft 28 to normal position, whereby the cam will be projected to slide the support opposite it or in line with which it is disposed inwardly to project the transmission gear thereof. It will be noted that by simply depressing the treadle the cam may be retracted to throw the transmission mechanism out at any operative point, an immediate release being effected, whereby quick control over the gearing is afforded, and that by means of the adjusting mechanism described the gearing may be easily and expeditiously adjusted for low, medium or high speed or reverse action.

The transmission rollers or disks are journaled upon brackets 20, each mounted upon one end of a rod 21, fitted to slide transversely of the frame in guide bars 22 and 23 extending between the cross bars, the outer ends of said rods having forks 24 in which are journaled anti-friction rollers 25. The rods are movable transversely of the frame toward and from the respective gear couples, and each rod is normally held in out of gear or retracted position by a coiled spring 26. This spring encircles the rod between the inner guide bar 22 and a fixed collar 27 on the rod, which collar bears against the outer cross bar 23 to limit the outward movement of the rod. Furthermore, it will be seen that the adjustments of any of the transmission members into or out of operative position will bring it directly between and in peripheral contact with the disks of the coacting couple whereby a rapid make and break action is established, preventing the slippage and loss of power, as well as the resultant shocks and strains, incident to many types of friction gearing when the gear elements are thrown into and out of engagement.

We claim:

1. A friction drive gearing comprising driving and driven shafts, friction disk couples in spaced relation upon said shafts, supports movable in a direction at right angles to said shafts, transmission disks carried by said supports to engage the respective couples and normally maintained out of contact therewith, an operating member slidably adjustable for engagement with any of said supports to selectively adjust the transmission disks into peripheral engagement with the coacting couples, and means for adjusting said member to an operative position and actuating the same to move the correlated support.

2. A friction drive gearing comprising driving and driven shafts, friction disk couples in spaced relation upon said shafts, sliding spring retracted supports movable in a direction at right angle to said shafts, transmission disks carried by said supports to engage the respective couples and normally maintained out of contact therewith, and means for actuating said supports to selectively adjust the transmission disks into peripheral engagement with the coacting couples.

3. A friction drive gearing comprising driving and driven shafts, friction disk couples in spaced relation upon said shafts, supports movable in a direction at right angles to said shafts, transmission disks carried by said supports to engage the respective couples and normally maintained out of contact therewith, a cam device adjustable into alinement with any of said supports, means for rocking said cam for actuating any of said supports to adjust the transmission disks into peripheral engagement with the coacting couples, means for shifting said device to an inoperative position to adapt the same to clear said supports in its adjustments.

4. A friction drive gearing comprising driving and driven shafts, friction disk couples in spaced relation upon said shafts, sliding spring-retracted supports movable in a direction at right angles to said shafts, transmission disks carried by said supports to engage the respective couples and normally maintained out of contact therewith, a control shaft, a cam carried by said shaft to selectively adjust the transmission disks into peripheral contact with the co-acting couples, and means for adjusting said cam.

5. Gearing of the character described comprising a drive shaft, a driven shaft, co-operating pairs of spaced driving gears on said shafts, transmission gears movable toward and from the respective pairs of driving gears, a device movable to different positions for selectively adjusting any of said transmission gears into and out of engaging position, and means for adjusting said device.

6. A friction drive gearing comprising driving and driven shafts, friction disk couples in spaced relation upon said shafts, sliding spring retracted supports movable in a direction at right angles to said shafts, transmission disks carried by said supports to peripherally engage the respective couples, an oscillatory control shaft parallel with the first named shafts, an operating lever movable to different operative positions, a cam feathered to slide on and oscillate with said control shaft, means for oscillating the control shaft to throw the point of the cam out of operative position, and means actuated by the operating lever to shift the cam along said control shaft for actuating said supports to selectively shift said transmission disks into contact with the co-acting couples.

7. Gearing of the character described comprising a drive shaft, a driven shaft, co-operating pairs of spaced drive gears on said shafts, transmission gears movable toward and from the respective pairs of driving gears, automatically retracted supports therefor, a device movable to different positions for selective engagement with any of said supports, means for adjusting said device into operative position and operating the same to actuate the correlated support, and means for throwing said device into and out of normal operative position.

In testimony whereof we affix our signatures in presence of two witnesses.

JOHN W. BARCLAY.
HOMER R. BARCLAY.

Witnesses:
S. S. BARCLAY,
C. E. BARCLAY.

---

Copies of this patent may be obtained for five cents each, by addressing the "Commissioner of Patents, Washington, D. C."